United States Patent
Meijer et al.

(10) Patent No.: US 7,836,056 B2
(45) Date of Patent: Nov. 16, 2010

(54) LOCATION MANAGEMENT OF OFF-PREMISE RESOURCES

(75) Inventors: Henricus Johannes Maria Meijer, Mercer Island, WA (US); Raymond E Ozzie, Seattle, WA (US); Thomas F. Bergstraesser, Kirkland, WA (US); Michael Connolly, Seattle, WA (US); Daniel S. Glasser, Mercer Island, WA (US); Matthew B. MacLaurin, Woodinville, WA (US); Kartik N. Raghavan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 11/613,355

(22) Filed: Dec. 20, 2006

(65) Prior Publication Data

US 2008/0082782 A1 Apr. 3, 2008

Related U.S. Application Data

(63) Continuation-in-part of application No. 11/536,440, filed on Sep. 28, 2006.

(51) Int. Cl.
*G06F 17/30* (2006.01)
(52) U.S. Cl. .................................................. 707/741
(58) Field of Classification Search .................. 707/741
See application file for complete search history.

(56) References Cited

U.S. PATENT DOCUMENTS

| | | | | |
|---|---|---|---|---|
| 4,827,508 A | * | 5/1989 | Shear | 705/53 |
| 5,263,165 A | | 11/1993 | Janis | |
| 5,537,404 A | | 7/1996 | Bentlet et al. | |
| 6,064,656 A | | 5/2000 | Angal et al. | |
| 6,157,929 A | * | 12/2000 | Zamiska et al. | 707/200 |

(Continued)

FOREIGN PATENT DOCUMENTS

EP 1376309 A2 1/2004

(Continued)

OTHER PUBLICATIONS

Brunner, et al. "Disruption Tolerant Networking" Dagstuhl Seminar Proceedings (2005) NEC Europe Ltd., Network Labooratories, 4 pages.

(Continued)

*Primary Examiner*—James Trujillo
*Assistant Examiner*—William Spieler
(74) *Attorney, Agent, or Firm*—Lee & Hayes, PLLC

(57) ABSTRACT

The innovation enables generation of an index of cloud-based resources (e.g., data, services, applications). The index can be used to retrieve a subset of the cloud-based resources by analyzing a user-generated or standing query. 'Identity' and contextual factors can be incorporated to enable rich indexing as well as subsequent retrieval of meaningful resources. The cloud-based resources can be indexed and/or searched in accordance with diverse criteria including, but not limited to, type, size, data created, date modified, author core identity, object size, etc. As well, the innovation can provide for dynamically indexing and/or searching resources in accordance with current contextual factors including, but not limited to, author current acting capacity (e.g., current identity), current engaged activity of a user, location, time, date, etc. All of these criteria can facilitate indexing and categorizing of the resources for later retrieval and rendering via a rich index view.

19 Claims, 12 Drawing Sheets

U.S. PATENT DOCUMENTS

| | | | |
|---|---|---|---|
| 6,195,683 B1 | 2/2001 | Palmer et al. | |
| 6,209,039 B1 | 3/2001 | Albright et al. | |
| 6,226,260 B1 | 5/2001 | McDysan | |
| 6,341,127 B1 | 1/2002 | Katsube et al. | |
| 6,353,823 B1 | 3/2002 | Kumar | |
| 6,434,532 B2 | 8/2002 | Goldband et al. | |
| 6,453,353 B1 | 9/2002 | Win et al. | |
| 6,469,991 B1 | 10/2002 | Chuah | |
| 6,496,482 B1 | 12/2002 | Kubota | |
| 6,598,046 B1 | 7/2003 | Goldberg et al. | |
| 6,707,820 B1 | 3/2004 | Arndt et al. | |
| 6,741,996 B1* | 5/2004 | Brechner et al. | 707/102 |
| 6,745,224 B1 | 6/2004 | D'Souza et al. | |
| 6,832,218 B1 | 12/2004 | Emens et al. | |
| 6,917,975 B2 | 7/2005 | Griffin et al. | |
| 6,961,318 B2 | 11/2005 | Fichou et al. | |
| 7,002,926 B1 | 2/2006 | Eneboe et al. | |
| 7,020,654 B1 | 3/2006 | Najmi | |
| 7,065,041 B2 | 6/2006 | Sen | |
| 7,103,806 B1 | 9/2006 | Horvitz | |
| 7,206,791 B2 | 4/2007 | Hind et al. | |
| 7,349,929 B2 | 3/2008 | Pfitzner | |
| 7,547,413 B2 | 6/2009 | Bauer | |
| 7,617,185 B2 | 11/2009 | Werner et al. | |
| 2002/0107843 A1 | 8/2002 | Biebesheimer et al. | |
| 2002/0124053 A1 | 9/2002 | Adams et al. | |
| 2003/0061365 A1 | 3/2003 | White et al. | |
| 2003/0074356 A1 | 4/2003 | Kaler et al. | |
| 2003/0105734 A1 | 6/2003 | Hitchen et al. | |
| 2003/0182394 A1 | 9/2003 | Ryngler et al. | |
| 2003/0229623 A1 | 12/2003 | Chang et al. | |
| 2004/0049537 A1* | 3/2004 | Titmuss | 709/203 |
| 2004/0076160 A1 | 4/2004 | Phaltankar | |
| 2004/0098456 A1 | 5/2004 | Krzyzanowski et al. | |
| 2004/0133589 A1* | 7/2004 | Kiessig et al. | 707/102 |
| 2004/0199507 A1* | 10/2004 | Tawa, Jr. | 707/7 |
| 2005/0075881 A1* | 4/2005 | Rigazio et al. | 704/270 |
| 2005/0131825 A1 | 6/2005 | Vijay | |
| 2005/0138419 A1 | 6/2005 | Gupta et al. | |
| 2005/0238024 A1 | 10/2005 | Taylor et al. | |
| 2005/0262132 A1 | 11/2005 | Morita et al. | |
| 2005/0289234 A1 | 12/2005 | Dai et al. | |
| 2006/0020700 A1 | 1/2006 | Qiu et al. | |
| 2006/0031518 A1 | 2/2006 | Jennings | |
| 2006/0036904 A1 | 2/2006 | Yang | |
| 2006/0041606 A1* | 2/2006 | Sawdon | 707/205 |
| 2006/0048224 A1 | 3/2006 | Duncan et al. | |
| 2006/0062161 A1 | 3/2006 | Tang et al. | |
| 2006/0074883 A1 | 4/2006 | Teevan et al. | |
| 2006/0085750 A1 | 4/2006 | Easton, Jr. et al. | |
| 2006/0123005 A1 | 6/2006 | Burnett et al. | |
| 2006/0179083 A1* | 8/2006 | Kulkarni et al. | 707/204 |
| 2007/0073937 A1* | 3/2007 | Feinberg et al. | 710/62 |
| 2007/0079357 A1 | 4/2007 | Grinstein | |
| 2007/0094256 A1 | 4/2007 | Hite et al. | |
| 2007/0185875 A1 | 8/2007 | Chang et al. | |
| 2008/0005115 A1 | 1/2008 | Corley et al. | |
| 2008/0126377 A1 | 5/2008 | Bush et al. | |

FOREIGN PATENT DOCUMENTS

| | | |
|---|---|---|
| EP | 1524580 A2 | 4/2005 |
| EP | 1564622 A2 | 8/2005 |
| WO | 2005022826 | 10/2006 |

OTHER PUBLICATIONS

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29, Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/ a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/ pdf &identifier=oai:arXiv_org:cs/0502091. Last accessed Sep. 20, 2006.

\* cited by examiner

LOCATION MANAGEMENT OF OFF-PREMISE RESOURCES

CROSS REFERENCE TO RELATED APPLICATIONS

This application is a continuation in part of U.S. patent application Ser. No. 11/536,440, filed on Sep. 28, 2006, and entitled RICH INDEX TO CLOUD-BASED RESOURCES, the entirety of which is incorporated herein by reference.

BACKGROUND

In traditional computer systems, client-side operating systems are employed to manage relationships between users, software applications, and hardware within a client machine, as well as that resident upon a connected intranet. In most cases, files and other data are locally stored within the resident computer or upon the intranet. In order to search for data and/or applications, modern versions of operating systems can provide a graphical user interface for accessing the file systems. The operating system can render the user interface onto a monitor which enables a user to control the computer and to locate files and/or documents stored locally within the resident computer or network.

However, the conventional computing paradigm is beginning to shift as maintaining security, indexing data, and the like for each client device can be quite expensive. As network connectivity has continued to improve, it has become apparent that a more efficient computing model includes lightweight (e.g., inexpensive) clients that continuously communicate with third-party computing devices to achieve substantially similar end results when compared to the conventional computing paradigm. In accordance with this architecture, the third-party can provide a 'cloud' of devices and services, such that requests by several clients can simultaneously be serviced within the cloud without the user noticing any degradation in computing performance. To provide an understanding of the 'cloud' architecture of data, services and/or applications, one may refer to the architecture in which distributed websites are maintained and accessed via the Internet.

Conventional Internet-based search, in general, employs search engines that typically analyze alphanumeric search queries in order to return results (e.g., websites). To the extent that image or other non-textual data is incorporated into a search, it is often pretagged with metadata, for example, where items are manually pre-tagged with metadata corresponding to physical attributes of the visual item. In other words, traditional search engines often employ pre-indexed metadata in order to return website links in response to a search query.

In the case of the Internet, search engines agents, often referred to as spiders or crawlers, navigate websites in a methodical manner and retrieve information about sites. For example, a crawler can make a copy of all or a portion of websites and related information. The search engine then analyzes the content captured by one or more crawlers to determine how a page will be indexed. Some engines index all words on a website while others may only index terms associated with particular tags such as such for example: title, header or metatag(s). Crawlers must also periodically revisit webpages to detect and capture changes thereto since the previous indexing.

Once indexes are generated, they typically are assigned a ranking with respect to certain keywords, and stored in a database. A proprietary algorithm is often employed to evaluate the index for relevancy, for example, based on frequency and location of words on a webpage. A distinctive factor in performance amongst conventional search engines is the ranking algorithm respectively employed.

Upon entry of one or more keywords as a search query, the search engine retrieves indexed websites that match the query from the database, generates a snippet of text associated with each of the matching sites and displays the results to a user. The user can thereafter scroll through a plurality of returned sites to determine if the sites are related to interests of the user.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system and methodology that enables index of cloud-based resources (e.g., data, services, applications). Other aspects are directed to employing the index to retrieve a subset of the cloud-based resources. In each scenario, 'identity' and other contextual factors can be incorporated to enable retrieval of meaningful resources.

As described above, in accordance with a typical client-server network, data is most often created, manipulated and saved upon a hard drive of the client or on an on-site server. With increased network connectivity, data storage and other services can be provided by third party service providers. In other words, the third party can provide a 'cloud' of devices and services, such that requests by several clients can concurrently be serviced within the cloud without the user(s) noticing any degradation in computing performance. As well, the client can be alleviated from locally maintaining resources (e.g., data, applications and services).

In aspects, the innovation can generate an index of the resources maintained within the cloud. These resources can be indexed in accordance with diverse criteria including, but not limited to, type, size, data created, date modified, author core identity, object size, etc. As well, the innovation can provide for dynamically indexing resources in accordance with other contextual factors including, but not limited to, author's current acting capacity (e.g., current 'identity'), current engaged activity of a user, location, time, date, etc. All of these criteria can facilitate indexing and categorizing the resources for later retrieval and rendering via a rich index view.

In order to address extensibility, the indexing functionality can be 'pluggable.' Thus, as formats and other resources become available, the system can accept plug-ins in order to update the indexing functionality to include these emerging formats. As well, the index can accept plug-ins to enable a user to search for appropriate index-generating programs and/or utilities.

In addition to indexing cloud-based resources, aspects of the invention provide for rapid search and location of user specific data and/or services within the cloud of devices and services provided by the third party. Accordingly, the index can be searched to identify and locate data and services relevant to the user in a particular capacity and/or context. In other aspects, users can access the index from any client device to retrieve and render a rich view of relevant data and services. For example, a user employing a client device located at an Internet café can retrieve selected (or relevant) information without downloading all available user specific information to the client device. Rather, the user can search the data and services using the rich index provided by the third party and retrieve those items that are currently desired.

In still other aspects, the search and retrieval of resources can be determined as a function of a device profile. For instance, upon connection from a particular client device, the system can automatically employ the index to render resources as a function of the capabilities of the particular device(s) employed or available. By way of more specific example, if a device has limited memory or display capabilities, the resources can be filtered and/or modified in order to conform and/or maximize available device capabilities.

In yet other aspects thereof, an artificial intelligence (AI) and/or machine learning and reasoning (MLR) component can be provided that employs a probabilistic and/or statistical-based analysis to prognose or infer an action that a user desires to be automatically performed. For instance, in one aspect, AI and/or MLR mechanisms can be employed to automatically determine index criterion. As well, in other aspects, AI and/or MLR mechanisms can be employed to automatically structure a search query on behalf of a user in order to retrieve resources.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
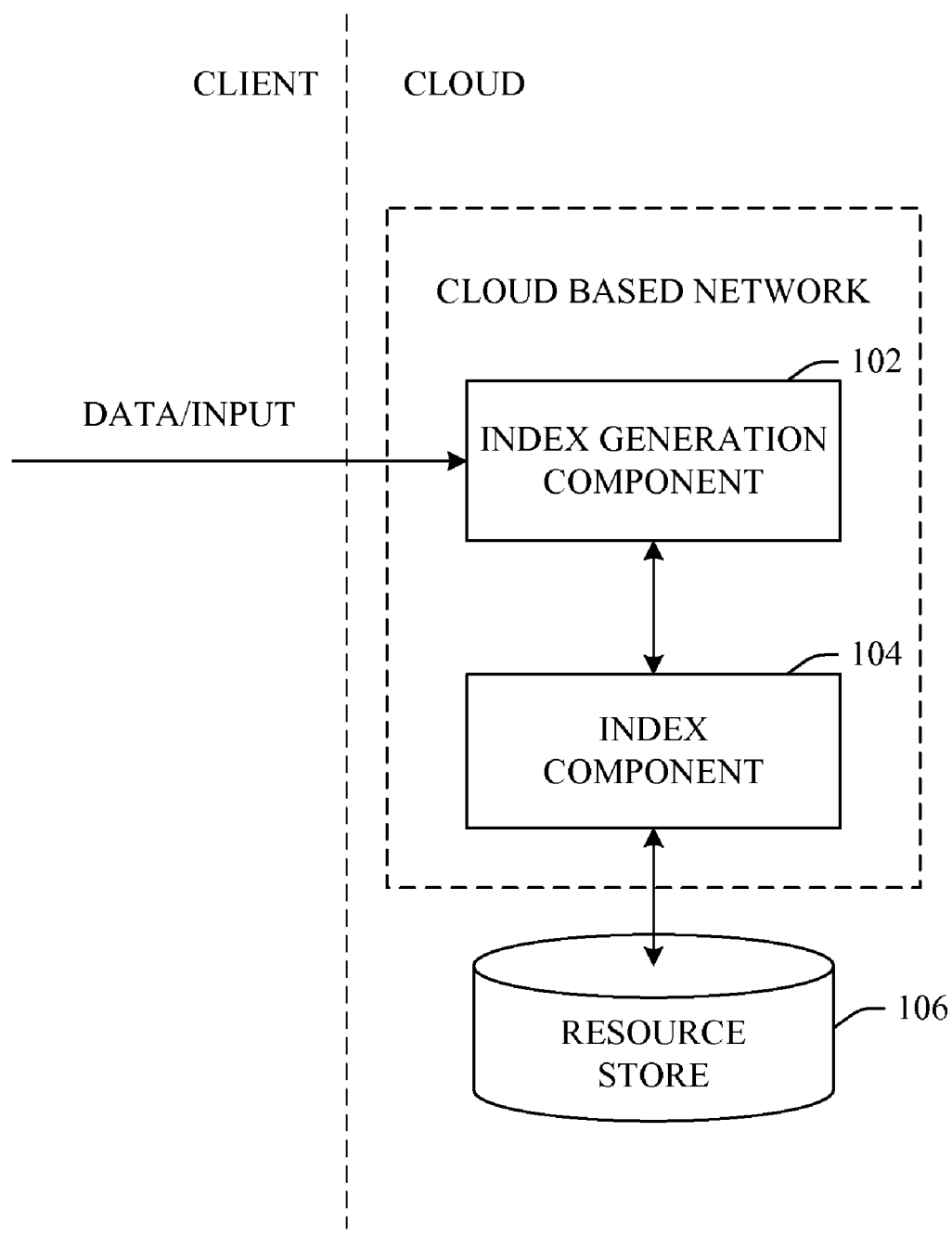
FIG. 1 illustrates a system that facilitates indexing off-premise resources in accordance with an aspect of the innovation.

The following terms are used throughout the description, the definitions of which are provided herein to assist in understanding various aspects of the subject innovation. It is to be understood that this definition is not intended to limit the scope of the disclosure and claims appended hereto in any way. As used herein, a 'cloud' can refer to a collection of resources (e.g., hardware and/or software) provided and maintained by an off-site party (e.g., third party), wherein the collection of resources can be accessed by a user via a wireless network. The 'off premise' resources can include data storage services, word processing services, and many other information technological services that are conventionally associated with personal computers or local servers.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates managing and/or organizing off-premise resources. More particularly, the system 100 can employ an index generation component 102 that establishes an index component 104 which maintains a reference (e.g., table, pointer(s), link(s)) that enables location of off-premise (e.g., cloud-based) resources (e.g., data objects, containers, applications, services) within a resource store 106. Although resource store 106 is illustrated as a single store, it will be appreciated that the storage of resources can be distributed in accordance with aspects of the innovation. For example, resources can be located in disparate locations exclusively maintained within the cloud environment.

In other aspects, the resource store 106 can be distributed within the cloud environment as well as within the client's local environment. Regardless of distribution related to the resource store 106, it is to be understood that the rich indexing and searching functionality of the innovation can be applied to any storage architecture without departing from the spirit and/or scope of the innovation and claims appended hereto. In other words, the index functionality described herein can be employed with respect to both cloud-based (e.g., off-premise) as well as client-based (e.g., on-premise) resources without departing from the spirit and/or scope of this specification and/or claims appended hereto.

In a typical client-server network, data is most often created, manipulated and saved upon a hard drive of the client or on an on-site server. As described above, with increased network connectivity, data storage and other services can be provided by third party service providers, for example, in a 'cloud-based' or off-site architecture. Since resources associated with cloud-based systems are often maintained in any number of locations (e.g., off-premise or on-premise), a user (or application) must know of the location in order to access the resource(s). The specification discloses this location functionality of resources within both the off-premise (e.g., cloud) as well as on-premise (e.g., client) environment. As described supra, although many of the examples described herein are directed to off-premise or cloud-based architectures, it is to be understood that the functionality described herein can be applied to 'hybrid' architectures (e.g., off-premise and/or on-premise) without departing from the spirit and scope of this specification and claims appended hereto.

The system 100 can provide for rapid search and location of user-specific data and/or services within the cloud-based architecture. In doing so, a rich index component 104 can be maintained and made available to a user. This index 104 can be searched to identify and locate data and services relevant to the user or appropriate context. Users can access the index 104 from any client device to retrieve 'cloud-based' data and/or services. For example, a user employing a client device located at an Internet café can retrieve selected information from the resource store 106 without downloading all available user specific information to the client device. More specifically, the user is able to search the data and services using the index 104 maintained within the cloud to retrieve those items that are currently desired or applicable to a current activity of a user. Although illustrated off-site in the cloud-based architecture, it is to be understood that the index can also be maintained locally at the client location as well as distributed between multiple locations (e.g., local as well as off-site).

Furthermore, the index and subsequent search and/or retrieval of relevant user data and services can be automatic as well as specific to a client device. By way of example, upon connection from a client device, the index 104 can be automatically searched and data and services can be retrieved from the resource store 106 in accordance with specifications of a particular device profile, client profile, client identity, client activity, etc. In other words, in one embodiment, the data or services can be filtered and rendered in accordance with the specifications of the client device. For example, if the connection from a client device provides limited bandwidth or if the client device is limited in processing power or physical capabilities (e.g., display screen size) the results of the search of the index can be filtered to provide results compatible with the connection or device specifications or limitations.

By way of particular example, a search conducted via a cell phone can automatically filter results that require more processing power than is available by the phone. Specifically, if required, the system can automatically filter video-based resources from a result set. This filtering can be based upon the device requirements as well as, or in conjunction with, context, identity, etc. More specific examples of this functionality will be better understood upon a review of the figures that follow.

Figure 2:
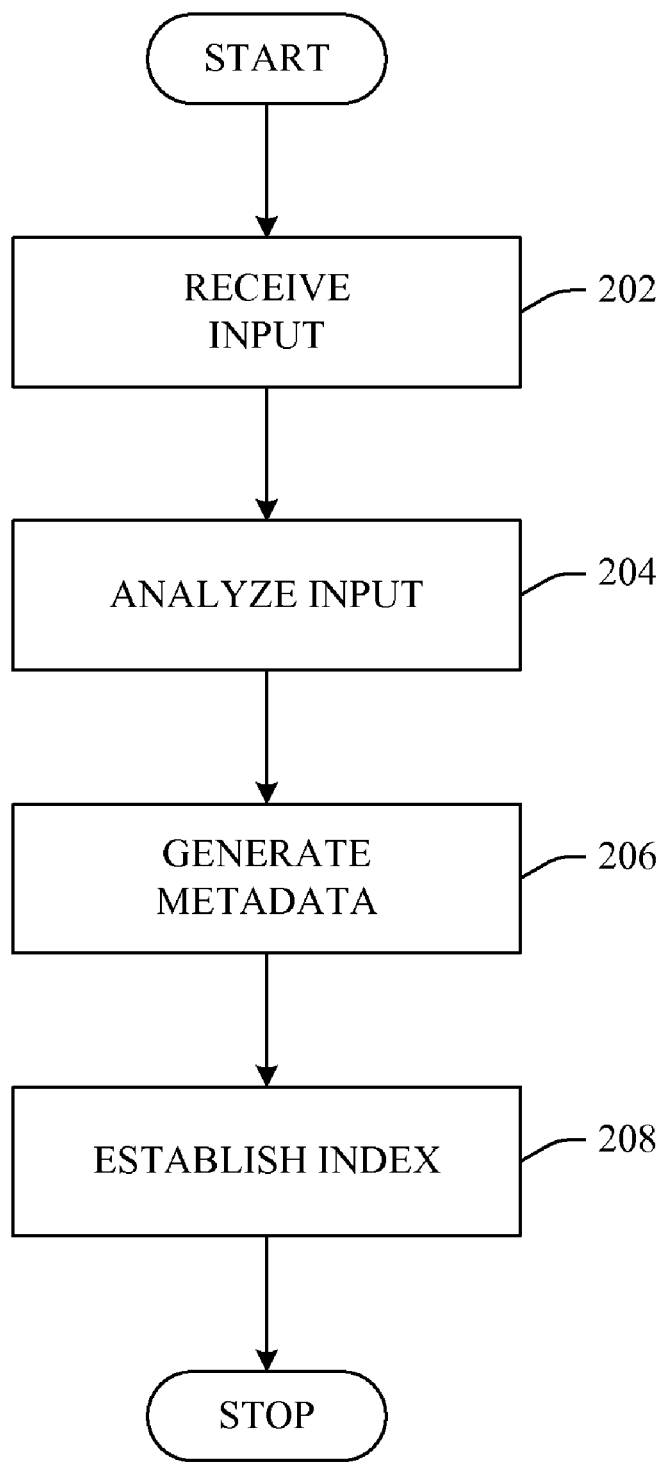
FIG. 2 illustrates an exemplary flow chart of procedures that facilitate establishing an index of off-premise resources in accordance with an aspect of the innovation.

FIG. 2 illustrates a methodology for automatically establishing an index in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

With reference to FIG. 2, at 202, an input that corresponds to a resource can be received. For example, the input can be a routine 'save' operation of a document, a receipt of an email or other external correspondence, an acknowledgement of a subscription service or the like. As such, at 204, the input (e.g., resource) can be analyzed in order to identify characteristics of the resource.

By way of example, the system can establish the type of data element, for example, image document, audio/music file, word processing document, etc. In addition to establishing basic information about the resource (e.g., type, size, date, author), the system can facilitate establishing contextual elements related to the resource(s). For instance, the system can facilitate establishment of an 'identity' of a user related to the resource. In addition to a user's actual identity, a current 'identity' can be established that relates to the particular resource. For example, a user can be acting in a specific capacity such as, work, home, etc., in which case the system can determine and associate this additional information related to a particular resource.

Moreover, other contextual factors, including, but not limited to, location, time, activity, presence, can be determined relative to a resource. In a particular example, the system can limit access to work-related resources when a user is on vacation. However, it is to be appreciated that contextual factors (e.g., engaged activity, time) can be analyzed to determine an appropriate identity to apply such that it may be possible to access work-related resources if, in fact, the current identity permits this access (even if out of the office or on vacation).

All of these descriptive characteristics can be converted to metadata at 206. Accordingly, at 208, an index can be established and that identifies associations and/or locations of resources located within the cloud. Additionally, the index can enable retrieval and/or rendering of the resources. An example of this rendering is set forth in accordance with FIG. 3.

The following example is provided to add context to the innovation and is not intended to limit the innovation in any way. As such, it is to be understood and appreciated that other examples exist that illustrate the functionality of the innovation. These additional aspects are to be included within the scope of this disclosure and claims appended hereto.

By way of example, suppose an employee generates a word processing document within the scope of employment. Upon saving the document in the 'cloud-based' resource store (e.g., 106 of FIG. 1), the document can be analyzed to determine basic criteria such as type (e.g., text), size, date created, date modified, etc. Additionally, the content of the document can be analyzed to determine keywords, recipient(s), topic(s), theme(s), subject, etc. Still further, the identity of the author can be established. As described above, in addition to this identity being established via biometrics, login/password, challenge/response, etc. techniques, the system can further establish context associated with the identity that relates to the particular resource (e.g., word processing document), for example via authentication/authorization mechanisms described in the related applications set forth supra.

For instance, the innovation can establish that a particular document was created at a particular time, from a particular device, associated with a particular activity while acting in a particular capacity. All of these factors can be established and linked to the resource in an index.

Figure 3:
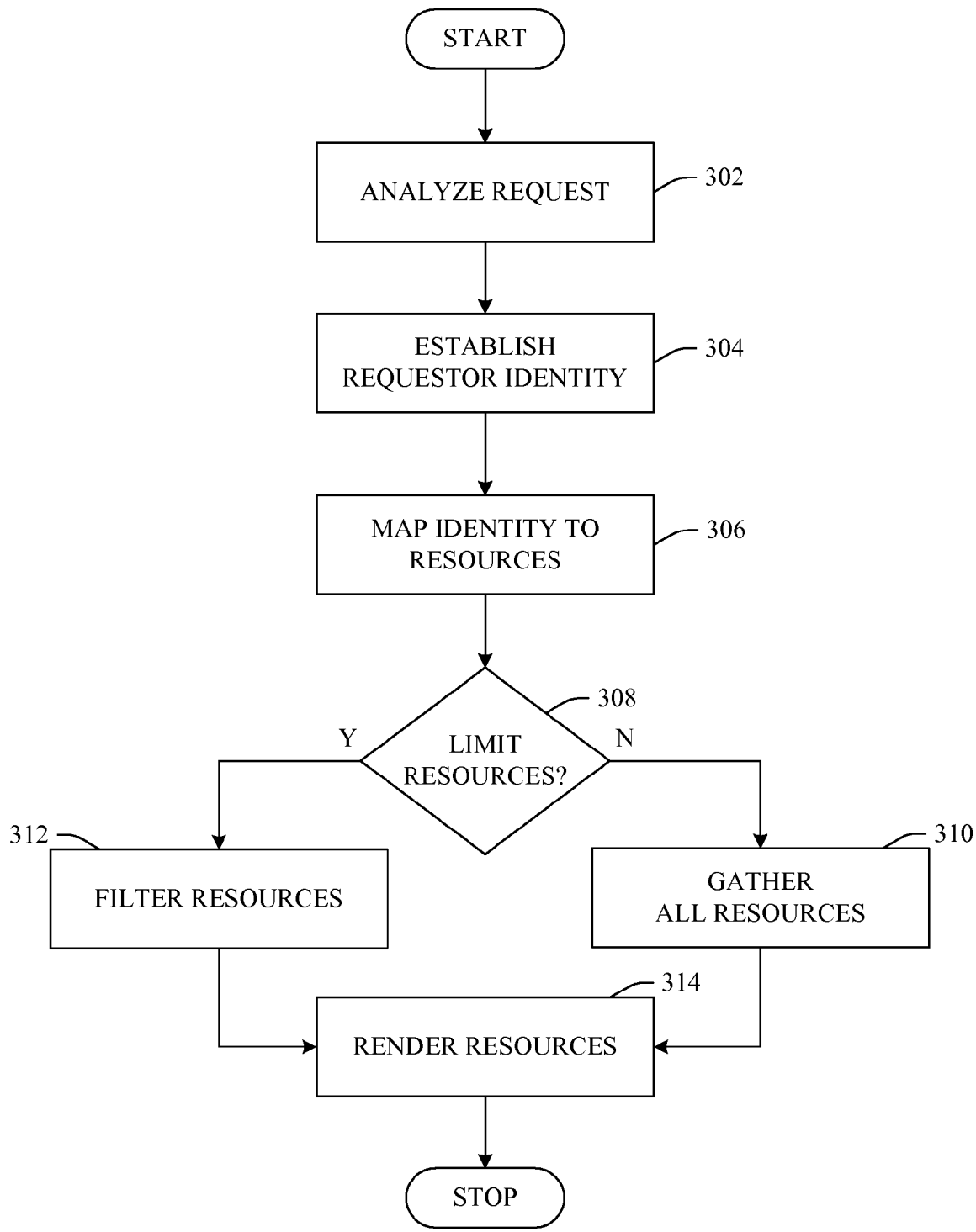
FIG. 3 illustrates an exemplary flow chart of procedures that facilitate employing an index to receive and/or render off-premise resources in accordance with an aspect of the innovation.

Referring now to FIG. 3, there is illustrated a methodology for employing an index to render resources within a cloud-based environment in accordance with the innovation. At 302, a request can be received and analyzed to identify the type of resources desired. For example, in aspects, the request can be generated by an authored user query or a preprogrammed standing query. As well, in other aspects, the request can be generated from an application or service.

At 304, the 'identity' of the requestor (or associated user) can be established. As described above, in addition to the 'identity' being the actual identity of a person, the identity can also be indicative of a user's current capacity, activity, role, etc. For instance, if a user is currently engaged in an activity related to employment, the 'identity' can be established such that it reflects an employment capacity, which can include role, organization affiliation(s), etc.

All of this 'identity' information can be employed at 306 in mapping applicable resources to the specific identity. In other words, at 306, the initial request can be considered as a function of the identity established at 304 in order to link (or point to) applicable resources.

Thus, continuing with the example above, at 306, once the 'identity' is established, resources can be mapped to the identity. In this act, the index (e.g., index generated via FIG. 2) can be employed to locate applicable resources. A determination can be made at 308 if the gathered resources should be limited in view of the request (e.g., based upon role, for example, privilege or security clearance). If the resources are not to be limited, at 310, the relevant resources can be gathered.

However, if a determination is made at 308 that the resources are to be limited, at 312 the resources can be filtered appropriately in accordance with the initial request from 302. In either case, the resources can be rendered at 314. As will be understood upon a review of the discussion that follows, the resources can be filtered, ranked, ordered, etc. as a function of the query, identity, context, etc.

Figure 4:
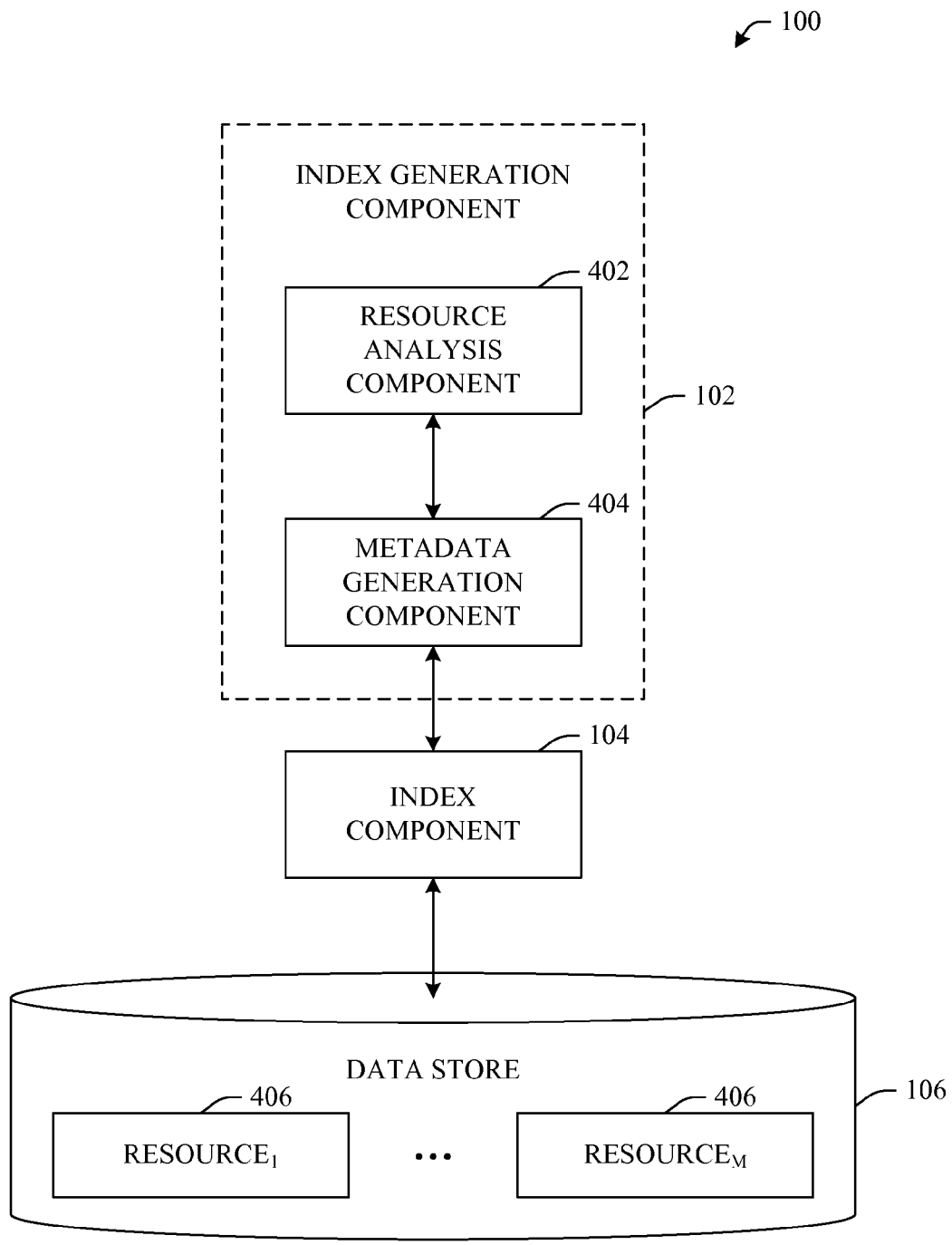
FIG. 4 illustrates a system that facilitates automatically analyzing an off-premise resource and generating in index in accordance with an aspect of the innovation.

Turning now to FIG. 4, a block diagram of system 100 that facilitates automatically establishing an index in accordance with an aspect of the innovation is shown. More particularly, index generation component 102 can include an input analysis component 402 and a metadata generation component 404 that together facilitate evaluating a resource to establish descriptive criterion and metadata associated therewith.

The resource analysis component 402 can establish a context related to a resource. As described above, the analysis component 402 can be employed to automatically determine basic criteria (e.g., type, size, creation date) as well as contextual criterion (e.g., location, user identity, current activity) associated with the resource. The metadata generation component 404 can be employed to create metadata associated with the established descriptive factors.

Effectively, the metadata established by the metadata generation component 404 can be employed by the index generation component 102 to establish the index component 104. As described supra, the index component 104 can be used to cross reference information related to 1 to M resources, where M is an integer. As shown, resource store 106 can include the 1 to M resources, which can be referred to individually or collectively as resources 406. In aspects, the index component 104 can employ pointers, links and other reference indicators in order to cross reference resources to index criterion. Further, it is to be understood that the metadata can be tagged onto the particular resources within the resource store 106.

Figure 5:
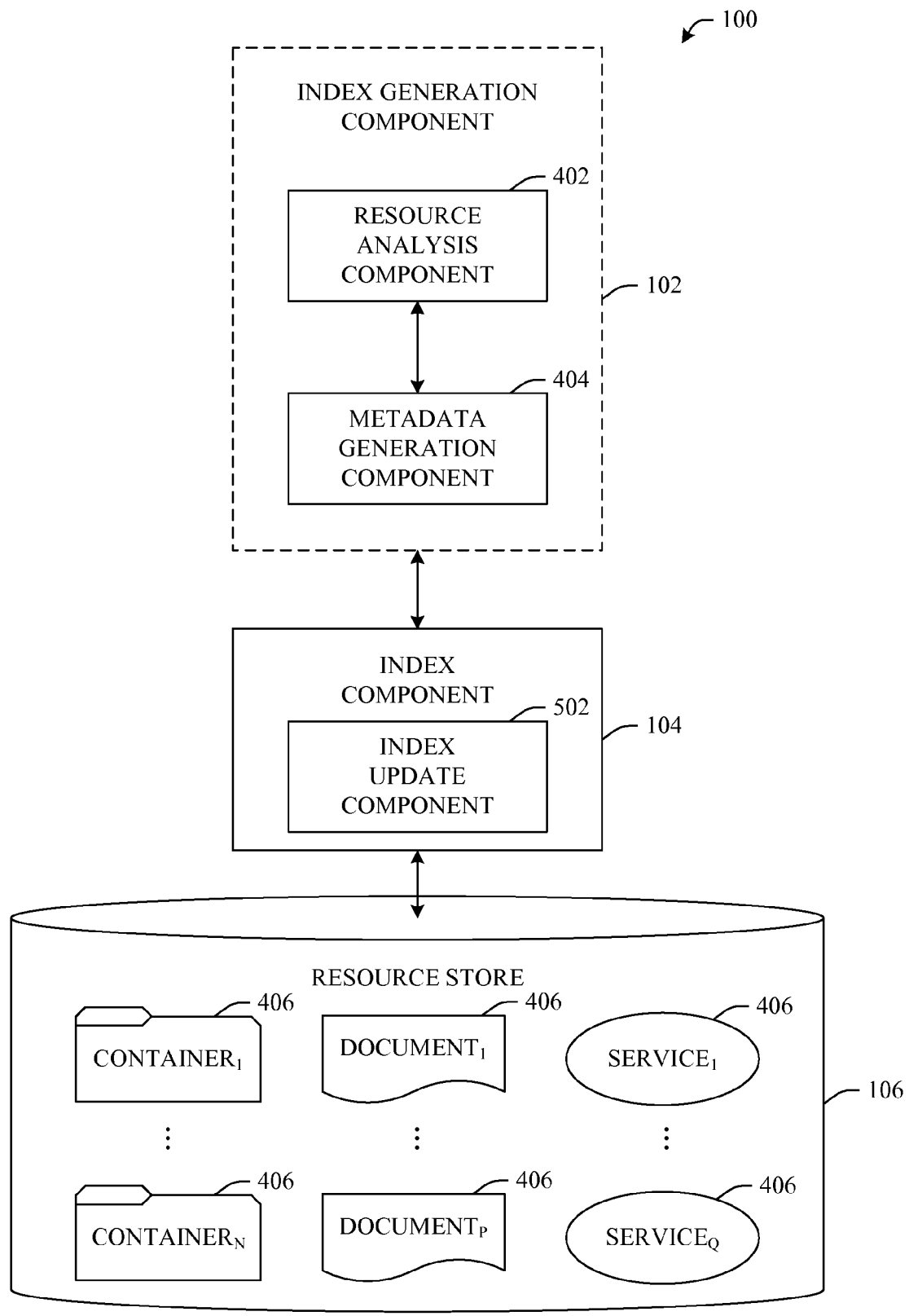
FIG. 5 illustrates a system that employs an update component (e.g., crawler) that automatically creates and/or updates the index in accordance with an aspect of the innovation.

FIG. 5 illustrates an alternative block diagram of system 100 that facilitates maintaining index component 104. More particularly, as shown in FIG. 5, index component 104 can include an update component 502 that facilitates automatically updating the index in accordance with any changes that may occur with respect to the resources 406. It will be appreciated that the update component can identify changes thereafter updating the index in many ways including, but not limited to pulling, pushing, pinging, publishing/subscribing, etc. All of these alternatives are to be included within the scope of this disclosure and claims appended hereto.

In examples, the update component 502 can be analogous to a crawler, spider, ant, robot (bot) or intelligent agent. In other words, the update component 502 can automatically analyze resources and/or information within the resource store 106 to determine criterion and/or changes with respect to resources. Essentially, in one aspect, the update component 502 can be used to locate new and/or updated resources by following associations (e.g., hypertext links, annotations, tags, crawler where external links establish 'edges') from location to location and indexing information based on search criteria. As shown, in aspects, it is to be understood that the resource store 106 can include 1 to N containers, 1 to P documents and/or 1 to Q services, where N, P and Q are integers. All of these resources can be indexed, linked and/or associated in accordance with aspects of the innovation.

It is to be understood and appreciated that, although possible, the functionality described herein is not intended to assume a closed world, that is, it is not to be assumed that the indexing functionality is not pluggable. Rather, the index generation component 102 (and the update component 502) are 'pluggable' and therefore extensible through the use of plug-ins and other appropriate updates. Essentially, it is to be understood that this extensibility is particularly useful in that, over time, there can be an ever increasing number of file formats (and resource formats) that can/will be indexed. Thus, the index generation component 102 is intended to be extensible in accordance with other embodiments.

As well, as formats become available, indexing services and applications will also become available. These indexing services and/or applications can also be indexed such that a user can search for specific index components to address needs and/or desires. Essentially, as described above, the index generating component 102 can be used to index most any resource type (e.g., data, service, application).

Moreover, it is to be appreciated that different users may desire to index the same data format in different manners. For example, if a user employs a 'micro-format' layered on top of HTML, this user may desire a different indexing scheme than when solely indexing HTML. Here, the index generation component 102 facilitates this personalization.

Still further, the indexing can be dependent on semantics of the data as well as structure of the data. The semantics and structure of the data can be referred to as 'format' as used herein. For instance, a user may desire to index programs (e.g., source code, target code) in various manners knowing the intended semantics. One example of this can be a PDB file format. Here, the user may want to search for particular types in their program, or for certain design patterns or algorithms. In other words, the indexing is not always purely accomplished upon the shape of the data but, sometimes upon a deep semantic knowledge of the data, or combination thereof.

In yet another example, the scope of the indexing can be monetized based upon functionality. By way of example, one can imagine several layers of indexing for a particular resource type. For instance, in accordance with the level of service, the index can be more precise or allow different queries (e.g., searches) to be executed upon the indexed resources. A particular use of this monetization can be directed to a subscription level that not only allows a user to search for music files (e.g., MP3 format), but also enables a user to search for specific lyrics within the files themselves. It is contemplated that this functionality can be applied to different resource types (e.g., via pattern recognition within image files). Essentially, it is to be understood that any level of index/search can be employed and/or monetized in accordance with embodiments of the innovation. These additional embodiments are to be included within the scope of this disclosure and claims appended hereto.

Figure 6:
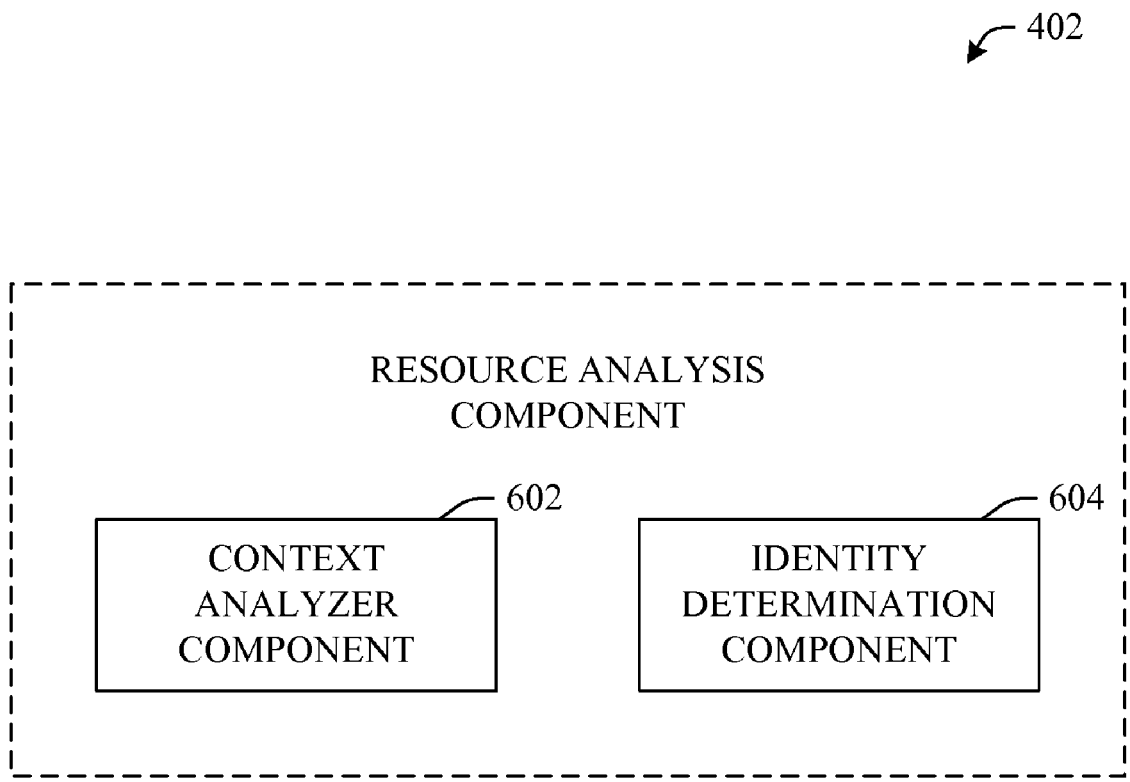
FIG. 6 illustrates an exemplary resource analysis component in accordance with an aspect of the innovation.

FIG. 6 illustrates a block architectural diagram of a resource analysis component 402 in accordance with an aspect of the innovation. More particularly, the resource analysis component 402 can include a context analyzer 602 and an identity determination component 604 that establish criteria related to a particular resource or group of resources.

Specifically, the context analyzer 602 can automatically establish contextual criteria associated with a particular resource. For instance, the context analyzer 602 can be used to evaluate the content of a resource and thereafter establish factors related to the content. Further, the context analyzer 602 can be used to evaluate context related to a user and/or device associated with a particular resource. These contextual factors can be used to index the resource for later retrieval and/or use.

As described above, if a resource is generated at a certain time, on a particular device, by a particular person in a particular capacity, these are all factors that can be used to establish a rich index entry associated with the resource. This rich index entry can be used to provide a user (or application) with a rich view of cloud-based resources regardless of their location within the cloud.

The identity determination component 604 can be employed to establish an 'actual' as well as 'current' identity of a user or author of a resource. In other words, the identity determination component 604 can be used to determine that a user is who they say they are (e.g., authentication) as well as to determine a current capacity, role, etc. associated with the user in view of the resource.

In operation, each of the context analyzer component 602 and the identity determination component 604 can employ physiological as well as environmental sensors in order to establish criteria associated to the resource as well as the user/author. It is to be understood and appreciated that all or a portion of these sensors can be located within the cloud based environment and/or the client's environment. These sensors can adapt and provide information as a function of a user's environment and/or context. For example, different information can be desired if a user is ill versus planning a party.

Thus far, the discussion above has been directed to systems and methods of establishing a resource index (e.g., 104) that can be used to track and locate cloud-based data and services (e.g., resources). As described above, the index can be automatically generated by analyzing a resource and establishing metadata that corresponds to resource criteria. For instance, metadata can be established and indexed that represents basic criteria such as resource type, size, date created, date modified, etc. Moreover, metadata can be established and indexed that represents contextual factors related to the resource such as, author identity, role, affiliations, engaged activity, device profile, etc. In aspects, this information can be automatically system generated and/or manually established by a user.

Figure 7:
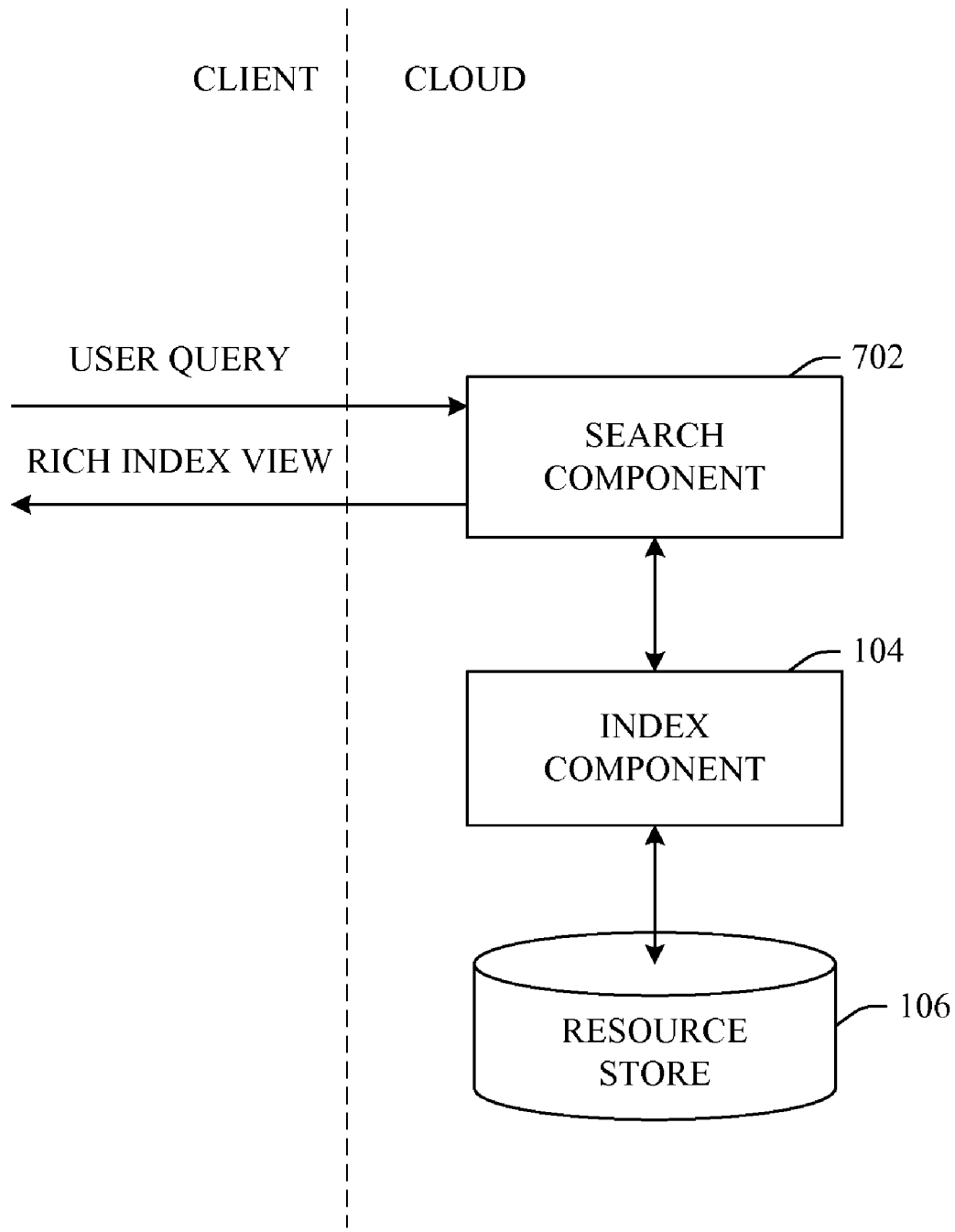
FIG. 7 illustrates a system that facilitates searching off-premise resources in accordance with an aspect of the innovation.

Once the index is in place, a search component (e.g., engine) can be employed to retrieve and/or render resources. FIG. 7 illustrates an exemplary system 700 that facilitates submitting a query and establishing a rich index view of resources from a cloud-based environment. Although the examples below describe a user generated query, it is to be understood that application generated queries, standing queries or the like can be employed to prompt retrieval of resources. These alternative aspects are to be included within the scope of this specification and claims appended hereto.

With reference now to FIG. 7, system 700 includes a search component 702 that analyzes a query (or input) and employs the index component 104 to return a subset of resources from resource store 106. As described above with reference to the resource analysis component (e.g., 402 of FIG. 4), the search component 702 can similarly establish search criteria, for example, keywords and context related to a particular query. As such, the index 104 can be employed to locate resources that correspond to the search criteria.

Additionally, it will be understood that a user can input search terms whereby the search component 702 can employ the index 104 to locate resources related to the terms. As well, the search component 702 can supplement the search terms with context data to further narrow the search to return more useful and accurate results. For example, suppose a user (or application) queries the resource store 106 for all image files. Here, the system 700 can automatically establish an 'identity' of a user (e.g., work, home) as well as other contextual information (e.g., location, current device, origination device, time, etc.). This additional information can be employed to retrieve results meaningful to a user and/or application.

Figure 8:
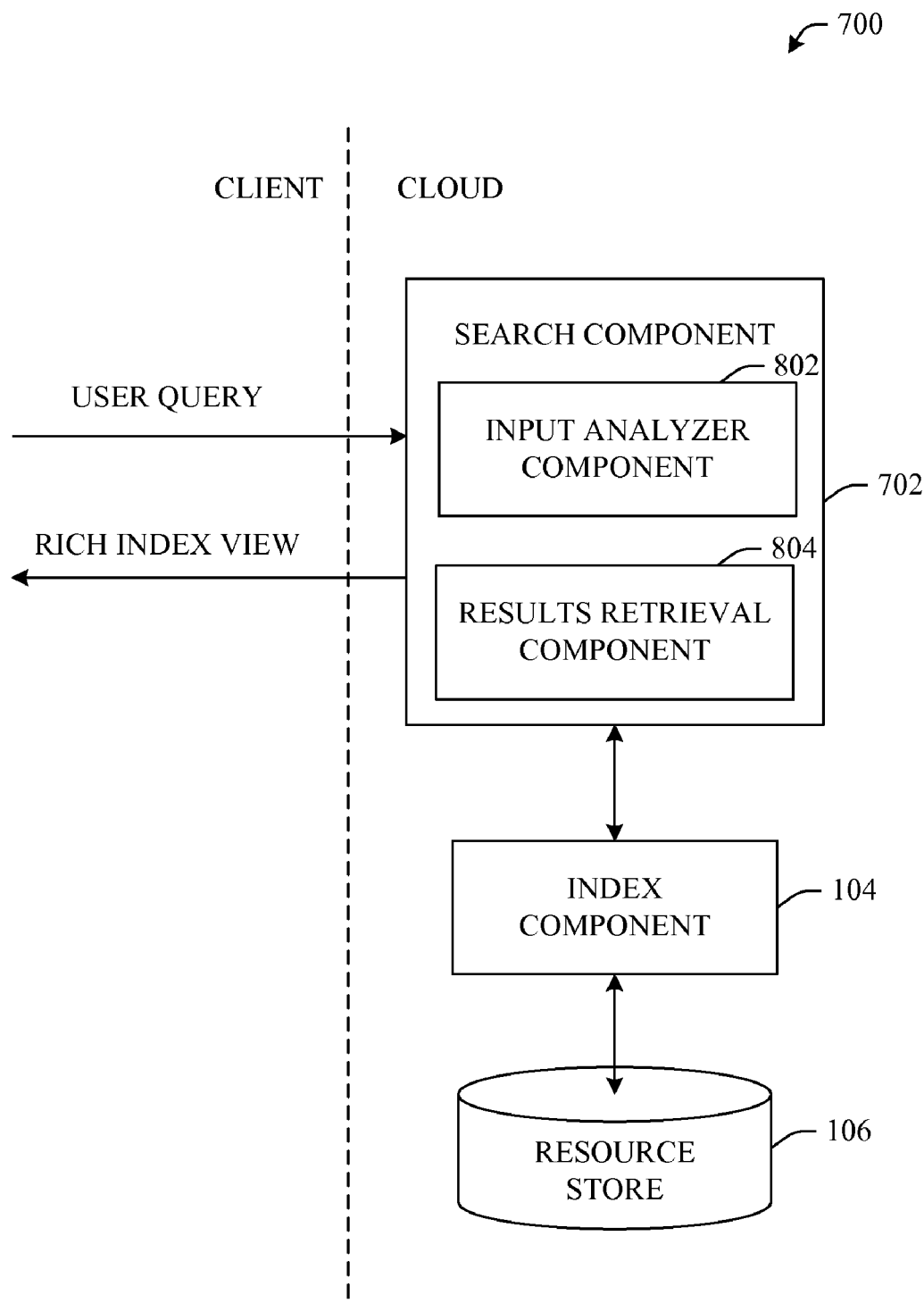
FIG. 8 illustrates a system that facilitates analyzing an input and retrieving resources as a function of the input in accordance with an aspect of the innovation.

Turning now to FIG. 8, an alternative block diagram of system 700 that facilitates providing a rich index view of resources is shown. More particularly, as illustrated in FIG. 8, the search component 702 can include an input (or query) analyzer component 802 and a results retrieval component 804 that employ the index component 104 to render resources from the resource store 106. Effectively, the input analyzer 802 and the results retrieval component 804 can be employed to establish and/or further narrow a query. Subsequently, the index component 104 can be used to cross reference the criteria to resources stored within the resource store 106.

Figure 9:
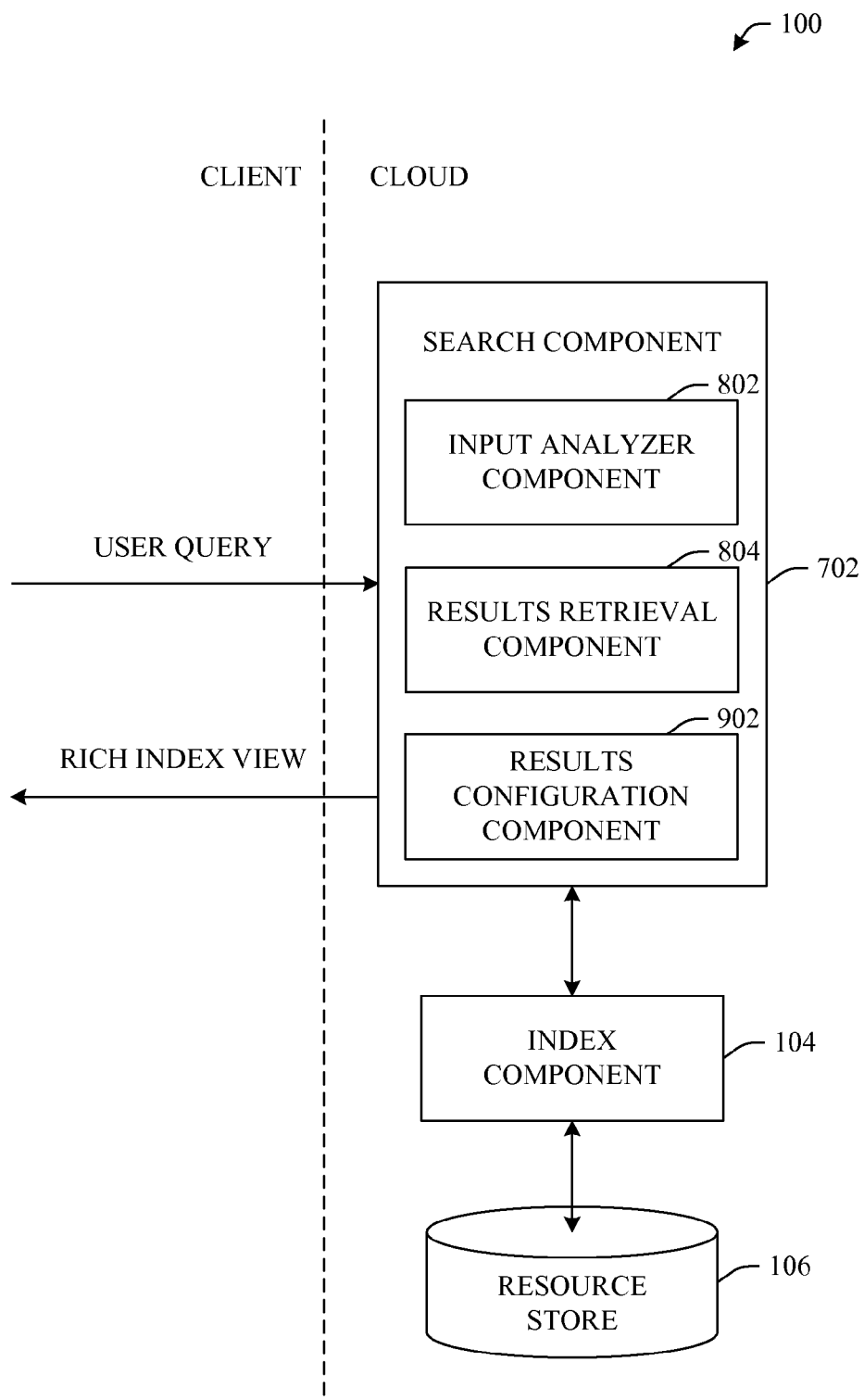
FIG. 9 illustrates a system that facilitates configuring search results in accordance with an aspect of the innovation.

Yet another block diagram of system 700 is illustrated in FIG. 9. In order to provide a rich index view of resources, the search component 702 can include a results configuration component 902. In operation, the results configuration component 902 can facilitate managing and/or organizing retrieved resource references prior to rendering via the rich index view.

Figure 10:
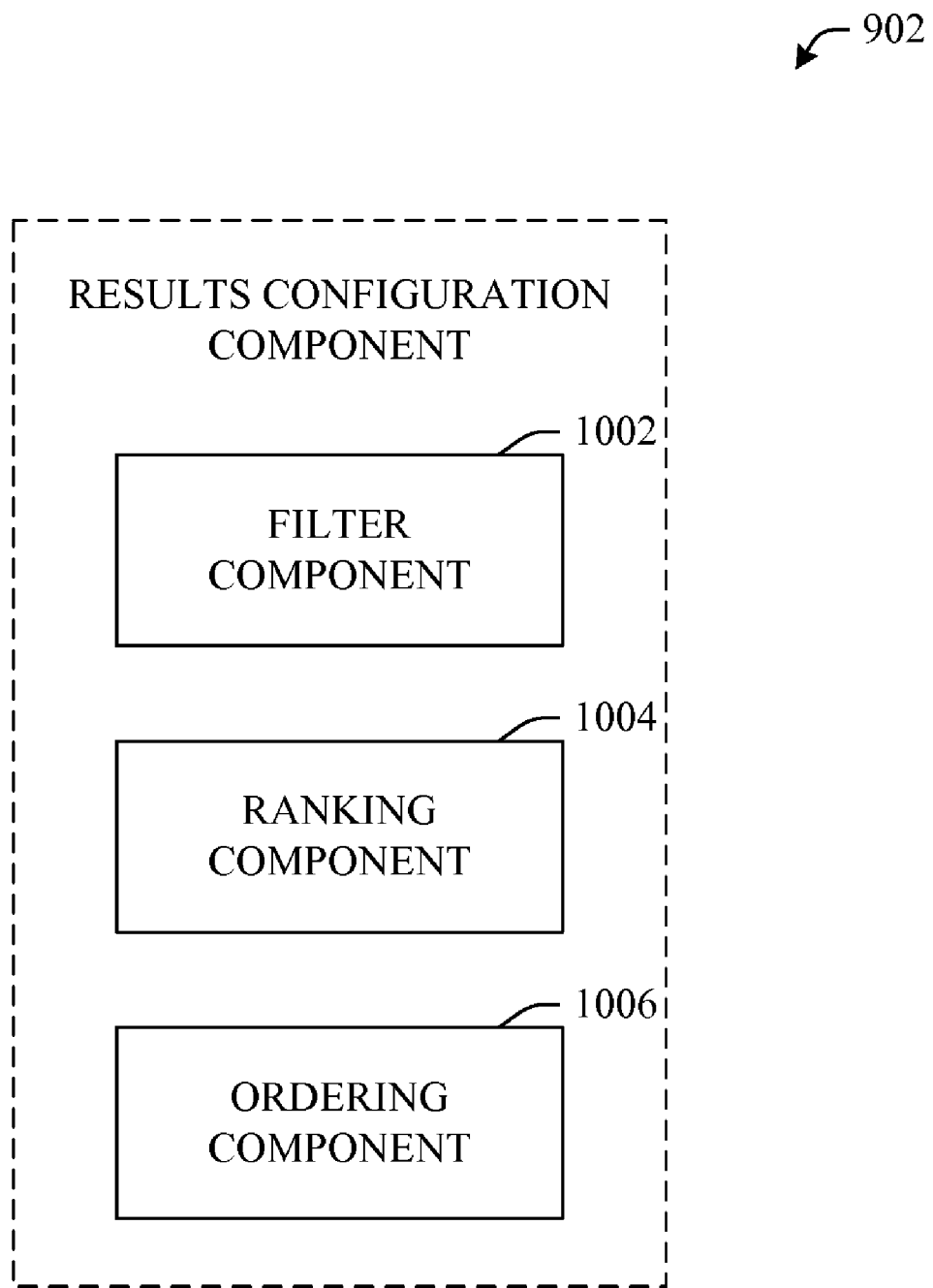
FIG. 10 illustrates an exemplary results configuration component that facilitates filtering, ranking and/or ordering results in accordance with an aspect of the innovation.

FIG. 10 illustrates an exemplary results configuration component 902 that facilitates organizing (e.g., filtering, sorting, ranking) resources prior to rendering via the rich index view or display. As shown, the results configuration component 902 can include a filter component 1002, a ranking component 1004 and an ordering component 1006. Each of these components can be employed to affect the rendering of the search results in accordance with a desired preference, a present context, etc.

For example, the filter component 1002 can be employed to automatically filter a subset of the retrieved resources based at least in part upon the particular time of day, location, device context, etc. In each scenario, the results configuration component 902 can infer an appropriate sorting and/or filtering criteria based upon contextual factors and/or historical action. Similarly, the ranking component 1004 and the ordering component 1006 can be employed to organize results based upon a determined and/or inferred context or previous action.

As described above, the innovation can employ an artificial intelligence (AI) and/or machine learning and reasoning (MLR) mechanisms to facilitate automating inference of one or more features in accordance with aspects of the subject innovation. By way of example, the subject innovation (e.g., in connection with indexing) can employ various AI-based schemes for carrying out various aspects thereof. For example, a process for determining which criteria to tag to a resource and/or how to index a resource can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria, how/if to index a resource, how/if to retrieve a resource and how/if to render a resource.

Figure 11:
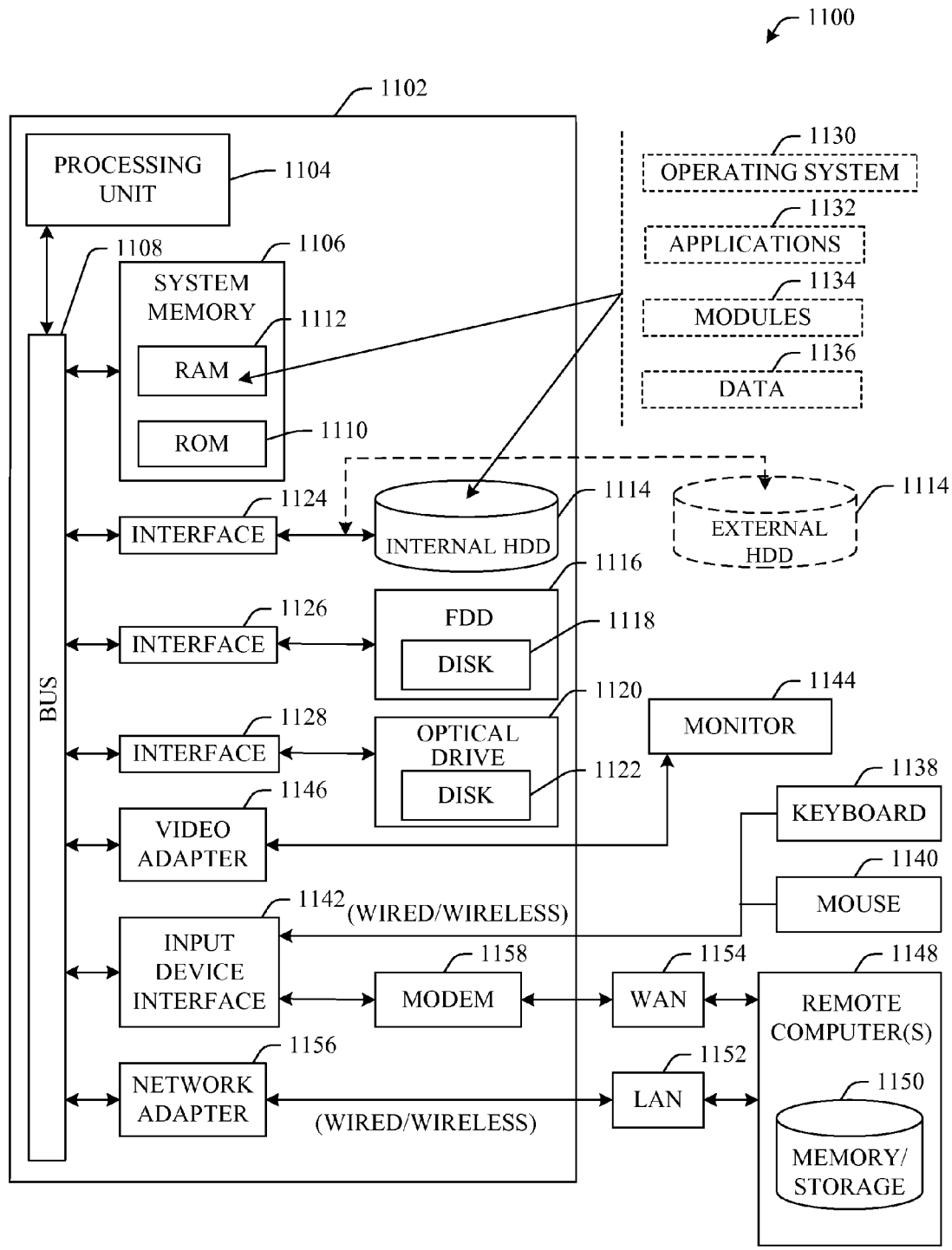
FIG. 11 illustrates a block diagram of a computer operable to execute the disclosed architecture.

Referring now to FIG. 11, there is illustrated a block diagram of a computer operable to execute the disclosed architecture of indexing and/or searching cloud-based resources. In order to provide additional context for various aspects of the subject innovation, FIG. 11 and the following discussion are intended to provide a brief, general description of a suitable computing environment 1100 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the innovation includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the innovation can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
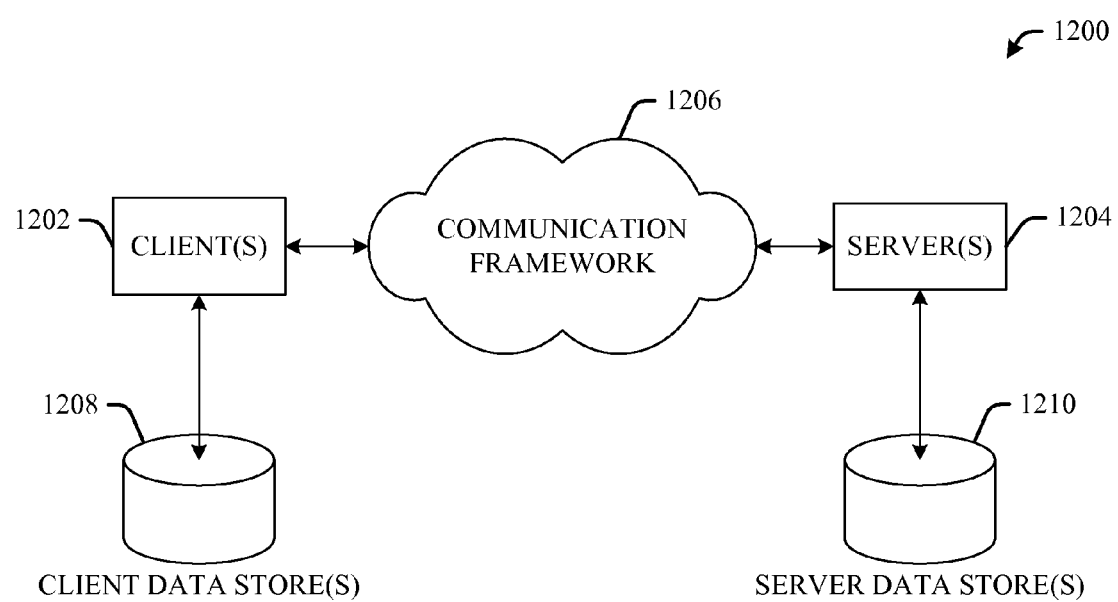
FIG. 12 illustrates a schematic block diagram of an exemplary computing environment in accordance with the subject innovation.

Referring now to FIG. 12, there is illustrated a schematic block diagram of an exemplary computing environment 1200 in accordance with the subject innovation. The system 1200 includes one or more client(s) 1202. The client(s) 1202 can be hardware and/or software (e.g., threads, processes, computing devices). The client(s) 1202 can house cookie(s) and/or associated contextual information by employing the innovation, for example.

The system 1200 also includes one or more server(s) 1204. The server(s) 1204 can also be hardware and/or software (e.g., threads, processes, computing devices). The servers 1204 can house threads to perform transformations by employing the innovation, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   one or more computing devices comprising one or more processors coupled to computer-readable storage media;
   a store in communication with the one or more computing devices, wherein a plurality of files received from a user via a network are stored in the store;
   an analysis component maintained on the computer-readable storage media and executed by the one or more processors to establish, for each file within a non-empty subset of the files received from the user, a context related to the subset, the context being derived from analysis of the subset based upon a set of criteria, the set of criteria comprising at least one of a current location or a current activity of the user from which the files within the subset were received, wherein the analysis component establishes contexts related to one or more additional subsets of the files received from the user such that a context is established for each file within the plurality of files received from the user;
   a metadata generation component maintained on the computer-readable storage media and executed by the one or more processors to create metadata for the plurality of files received from the user based on the context established for each file of the plurality of files; and
   an index generation component maintained on the computer-readable storage media and executed by the one or more processors to generate an index that represents the plurality of files received from the user as a function of the metadata.

2. The system of claim 1, wherein the plurality of files are at least one of image files, audio files, word processing document files, or application files.

3. The system of claim 1, further comprising a plug-in that is accepted at the one or more computing devices for expanding types of file formats accepted by the system.

4. The system of claim 1, the metadata generation component automatically creating the metadata, wherein the metadata is further associated to semantics of the subsets of the files.

5. The system of claim 1, wherein there are a plurality of the subsets of the files, wherein each of the subsets of the files is indexed in a disparate manner.

6. The system of claim 1, wherein the index is maintained at the one or more computing devices, and also maintained locally on a client computing device of the user.

7. The system of claim 1, further comprising a search component to accept a search request from the user and employing the index to locate one or more of the files in accordance with the search request.

8. The system of claim 7, the search component employing the index to retrieve one or more files associated with a current context of the user.

9. The system of claim 8, the search component determining the current context of the user from at least one of a current location of the user, a current time at which the search request is made by the user, or a current activity of the user.

10. The system of claim 8, the search component determining the current context of the user from a device profile of a device from which the search request is submitted.

11. The system of claim 10, the search component filtering results retrieved from the index in response to the search request to limit exposure of the one or more files located as a result of the search request, wherein the filtering is based on the current context determined for the user.

12. The system of claim 9, the search component ranking the one or more files based at least in part upon the current context determined for the user.

13. The system of claim 9, the search component ordering the one or more files based at least in part upon a preference of the user.

14. The system of claim 1, further comprising a machine learning and reasoning (MLR) component that employs a statistical-based analysis that infers how to index a particular file based upon observed user behavior.

15. The system of claim 1, further comprising a monetization component that provides multiple layers of indexing for particular files of particular file types.

16. A computer-implemented method of managing a plurality of files that correspond to a user, the method being implemented by one or more processors executing instructions stored in computer-readable storage media, the method comprising:
   receiving the plurality of files, by the one or more processors, from the user via a network;
   storing the plurality of files in a store in communication with the one or more processors;
   automatically analyzing each file received from the user to establish, for each file within a non-empty subset of the files received from the user, a context related to the subset, the context being derived from analysis of the subset based upon a set of criteria, the set of criteria comprising at least one of a current location or a current activity of the user from which the files within the subset were received, wherein the analysis component establishes contexts related to one or more additional subsets of the files received from the user such that a context is established for each file within the plurality of files received from the user;

creating metadata for the plurality of files received from the user based on the context established for each file of the plurality of files; and generating an index that represents the plurality of files received from the user as a function of the metadata.

17. The method of claim 16, further comprising determining a user-specific indexing scheme provided by the user, wherein the generating the index employs the user-specific indexing scheme to generate the index.

18. The method of claim 16, further comprising storing the index at one or more server computing devices comprising the one or more processors, and further storing the index locally at a client device of the user.

19. A system for management of a plurality of files received from a user, comprising:

one or more server computing devices comprising one or more processors coupled to computer-readable storage media;

a store in communication with the one or more server computing devices, the plurality of files received from the user being stored in the store;

an analysis component maintained on the computer-readable storage media and executed by the one or more processors to automatically establish, for each file within a non-empty subset of the files received from the user, a context related to the subset, the context being derived from analysis of the subset based upon a set of criteria, the set of criteria comprising at least one of a current location or a current activity of the user from which the files within the subset were received, wherein the analysis component further establishes contexts related to one or more additional subsets of the files received from the user such that a context is established for each file within the plurality of files received from the user;

a metadata generation component maintained on the computer-readable storage media and executed by the one or more processors to create metadata for the files received from the user based on the context established for each file of the plurality of files, the metadata generation component tagging the metadata created for at least some of the files to the corresponding files stored in the store;

an index generation component maintained on the computer-readable storage media and executed by the one or more processors to generate an index from the plurality of files received from the user, wherein the index is generated based at least in part on the metadata created for the established contexts for the plurality of files received from the user;

the index generation component configured to expand capability for generating the index by accepting a plug-in for adding a file format related to a subset of the files received from the user for indexing the subset of files comprising the format added by the plug-in;

a search component maintained on the computer-readable storage media and executed by the one or more processors to receive a search request from the user for locating one or more files of the plurality of files stored in the store;

the search component configured to identify automatically a context of the search request based upon a determined context of the user when the search request is received; and the search component configured to search the index and identify the one or more files as a function of the search request and the determined context of the user.

* * * * *